United States Patent [19]

Cocksedge

[11] Patent Number: 4,634,137
[45] Date of Patent: Jan. 6, 1987

[54] TRICYCLE AND DRIVE THEREFOR

[76] Inventor: George T. Cocksedge, 7530 Mountain Rd., Niagara Falls, Ontario L2E 6S4, Canada

[21] Appl. No.: 765,296

[22] Filed: Aug. 13, 1985

[30] Foreign Application Priority Data

Aug. 17, 1984 [CA] Canada .................................. 461301

[51] Int. Cl.$^4$ .......................... B62M 1/04; B60K 5/08
[52] U.S. Cl. .................... 280/256; 280/269; 280/282
[58] Field of Search ............... 280/282, 256, 277, 253, 280/269, 268, 267, 281 LP

[56] References Cited

U.S. PATENT DOCUMENTS

| 456,625 | 7/1891 | Malfait | 280/256 |
|---|---|---|---|
| 465,140 | 12/1891 | McCammon | 280/256 |
| 1,202,656 | 10/1916 | Biot | 280/256 |
| 1,427,589 | 8/1922 | Greenison | 280/256 |
| 1,480,871 | 1/1924 | Tiffin | 280/256 |
| 2,012,534 | 8/1935 | Hendricks | 280/257 |
| 3,504,934 | 4/1970 | Wallis | 280/282 |
| 3,561,778 | 2/1971 | LaBrie | 280/282 |
| 3,820,820 | 6/1974 | Kutz | 280/253 X |
| 3,913,929 | 10/1975 | Matsuura | 280/269 |
| 4,029,334 | 6/1977 | Trammell, Jr. | 280/261 |
| 4,072,325 | 2/1978 | Bright et al. | 280/772 |
| 4,088,199 | 5/1978 | Trautwein | 280/269 X |
| 4,351,410 | 9/1982 | Townsend | 280/267 |
| 4,360,224 | 11/1982 | Sato et al. | 280/282 X |
| 4,456,277 | 6/1984 | Carpenter | 280/282 |

FOREIGN PATENT DOCUMENTS

351989 6/1919 Fed. Rep. of Germany .
1056181 2/1954 France .

*Primary Examiner*—John A. Pekar
*Attorney, Agent, or Firm*—Panitch Schwarze Jacobs & Nadel

[57] ABSTRACT

A pedal drive for a tricycle having a single driven rear wheel and two steerable front wheels. There are a pair of matched, laterally spaced sprockets mounted on a transverse shaft and a pair of matched, laterally sprockets rotatably mounted forwardly of the sprockets on said shaft. Each of the forward sprockets is aligned in a common plane with a corresponding sprocket on the transverse shaft. An endless chain extends about each pair of corresponding sprockets. Two elongate arm members, each with a foot pedal mounted on its bottom end, are pivotally mounted on a frame member of the tricycle. Two connecting links join the arm members to the endless chains. A third endless chain transmits power via a third sprocket on the transverse shaft to the rear wheel. The preferred tricycle is tiltable in order that it can maneuver corners quickly. Spring means are provided to bias the tricycle towards a desired tilting or non-tilting position.

16 Claims, 15 Drawing Figures

TRICYCLE AND DRIVE THEREFOR

BACKGROUND OF THE INVENTION

This invention relates to tricycles and in particular to tricycles having a single, manually driven rear wheel.

A variety of drives, including pedal drives have been known in the past for driving bicycles and tricycles, usually by means of a person's legs. Many of the known systems are not in common use either because they are generally too expensive to manufacture or maintain or they are not very reliable. The well known chain drive system used on most bicycles is generally reliable but this system is not very efficient, particularly when used by a normal or amateur cyclist who only pushes down on the pedals. The maximum theoretical efficiency where the cyclist only uses a pushing effort on the pedals is 64%.

Although tricycles are well known, they are commonly only in use by small children who do not have the ability to handle a bicycle yet. One advantage of a tricycle is that it is able to stand up on its own normally without balancing skills or the use of any kickstand or other form of support. A major difficulty with the common tricycle is that it is not able to travel at a high rate of speed, that is, a speed comparable to a standard bicycle. One reason why a tricycle is not built to travel at higher speeds is that the normal tricycle is unable to maneuver quickly around corners or curves. Unlike a bicycle, a tricycle can not be "leaned" into a curve to compensate for the centrifugal forces acting on it as the tricycle maneuvers the curve.

U.S. Pat. No. 3,820,820 issued June 28, 1974 to John Kutz describes a pedal drive for a bicycle wherein each of the two pedals is mounted upon an endless chain which defines the path of the pedal. The two pedal chains move along upright, generally oblong paths between upper and lower sprockets of the same size. The pedals are attached to the chains to move in opposition. A third endless chain transmits power from the pedal drive to the rear wheel. The difficulty with this known system is that at higher pedalling speeds, the rider's feet will have to undergo relatively quick lateral movements at the top and bottom ends of the pedal paths. The pedals will tend to move laterally from under the inertially slowed feet so that the rider may be uncomfortable with the movement of his feet. Also this known pedal drive under heavy thrust loads may suffer from the chains tending to run off the sprockets. This problem is aggravated by the need for the frame, linkages and connections to be light, individually rigid, durable and relatively inexpensive in a vehicle of this type.

U.S. Pat. No. 4,088,199 issued May 9, 1978 to W. Trautwein describes a three wheeled motorcycle having two steerable front wheels and a driven rear wheel. The front wheels are interconnected with a conventional motorcycle frame by a parallelogram configured coupling assembly utilizing a pair of cross members pivotally connecting hubs of the front wheels. The vehicle also comes with a locking bar that is pivotally supported on a foot rest and that can be used to prevent tipping of the vehicle. A rider may apply a stabilizing force for holding the vehicle upright while stopped and while operating at low speeds without contacting the ground. Also he may effect a banking operation by leaning and applying a force by one of his feet to a portion of the foot resting platform on one side of the vehicle. There is no suggestion in the patent that the design could be used for a tricycle and indeed the design appears impractical for this purpose.

U.S. Pat. No. 4,072,325 issued Feb. 7, 1978 to Bright Engineering, Incorporated describes a three wheeled vehicle having two steerable front wheels. It is equipped with a device for automatically stabilizing the vehicle against the effects of transverse acceleration forces and roll movements, due to turning maneuvers by means of an on-board pendulum. As shown in FIGS. 8 and 9, the vehicle is able to assume a leaning attitude while negotiating a turn either on a level road bed or on a banked road bed. The vehicle is said to have improved stability due to the concentration of a large part of the mass of the vehicle, including the operator and the passenger if any, in the suspended pendulum element of the vehicle. The approach taken in this patent is not practical for a bicycle or tricycle design wherein the total vehicle weight might be as much as 45 pounds with the centre of mass two feet above the road and the weight of the operator, the average weight of whom is 170 pounds, is centered at least three feet above the road.

It is an object of the present invention to provide a pedal drive for a multiwheel vehicle that is quite efficient at converting the pedalling power provided by an operator into mechanical, rotational power able to drive the vehicle.

It is a further object of the present invention to provide a tricycle that is able to negotiate a curve at reasonably high speed by being "leaned" into the curve to compensate for the centrifugal forces acting on the tricycle.

SUMMARY OF THE INVENTION

According to one aspect of the present invention, a pedal drive for driving a multiwheel vehicle having a driven wheel comprises a pair of matched, laterally spaced rear sprockets adapted to be rotatably mounted on a frame of said vehicle and a pair of matched, laterally spaced sprockets rotatably mounted forwardly of the rear sprockets, each of the forward sprockets being aligned in a common plane with a corresponding rear sprocket. An endless chain extends about each pair of corresponding sprockets. Pedal means are provided and are adapted to be pivotally mounted on a frame member of the vehicle. The pedal means comprise two elongate arm members each with a foot pedal mounted on its bottom end. Each of a pair of connecting links is connected to one of the elongate arm members at one end and to one of the endless chains at the other end of the link. A connecting device secures the one end of each link to its respective arm member, said connecting device permitting pivotal movement of the link in a vertical plane defined by the movement of the respective arm member and in a plane substantially perpendicular to this vertical plane. Transmission means are adapted for connection to the aforesaid driven wheel to drive the same in response to rotation of said rear sprockets.

According to another aspect of the invention, a tricycle includes a frame having means for mounting front and rear wheels and a steering mechanism, a seat mounted on the frame, a single driven rear wheel mounted to the frame, and a pair of steerable, spaced-apart front wheels mounted to the frame. Means are provided to turn the front wheels substantially in unison. A rotatable transverse shaft is mounted on the frame and a pair of matched, laterally spaced rear sprockets are mounted on this shaft. A pair of matched, laterally spaced front sprockets are rotatably mounted on the frame and are disposed forwardly of the rear sprockets. Each of the front sprockets is aligned in a common plane with a corresponding rear sprocket. An endless chain extends about each pair of corresponding sprockets. Pedal means are pivotally mounted on the frame at a forward point thereof and comprise two elongate arm members each with a foot pedal mounted on its bottom end. Each arm member is pivotally connected to the frame at its top end. Each of a pair of connecting links is connected to one of the elongate arm members at one end and to one of the endless chains at the other end of the link. A connecting device secures one end of each link to its respective arm member, said device permitting pivotal movement of the link member in a vertical plane defined by the movement of the respective arm member and in a plane substantially perpendicular to this vertical plane. Transmission means are connected with the transverse shaft and to the rear wheel to drive the latter in response to pedalling of the pedal means.

According to still another aspect of the invention, a tricycle comprises a frame including means for mounting front and rear wheels and a steering mechanism. The steering mechanism includes a central steering column and handlebar means pivotally mounted in this column. A seat is mounted on the frame to which is connected a single rear wheel. The tricycle also has means for driving this rear wheel and a pair of spaced-apart front wheels each connected to the frame by its own steering column and steerable by the steering mechanism. The mounting means include two tiltable, transversely extending elongate members comprising leaf springs, each of which has the steering column of one of the front wheels pivotally connected to one end thereof and the steering column of the other of the front wheels pivotally connected to the other end thereof. Means are provided to tiltably connect the centre of each transversely extending elongate member to the central steering column. In additon, there are means for biasing the tilting elongate members to a tilting or non-tilting position. The biasing means engage at least one of the two tiltable elongate members.

Further features and advantages will become apparent from the following detailed description taken in conjunction with the accompanying drawings illustrating a preferred embodiment.

BRIEF DESCRIPTION OF THE DRAWINGS

In the drawings,

FIG. 16 is a graphical illustration of one power stroke using the pedal drive of the present invention.

DETAILED DESCRIPTION OF PREFERRED EMBODIMENT

Figure 1:
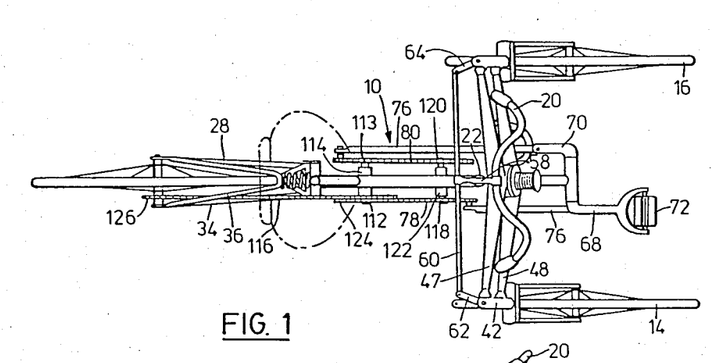
FIG. 1 is a top view of a tricycle constructed in accordance with the present invention.
Figure 2:
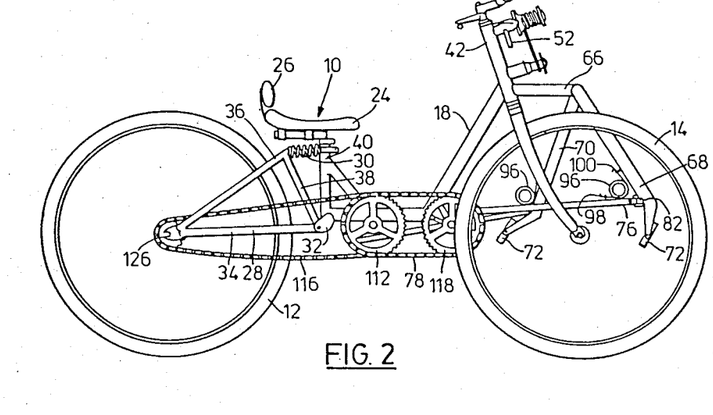
FIG. 2 is a side elevation of the tricycle.

The tricycle 10 of the present invention has a large driven rear wheel 12 and two large steerable front wheels 14 and 16. The rear and front wheels can be constructed and mounted in the same manner as for a standard bicycle except for the difference hereinafter noted. The tricycle has a metal frame 18 which includes means for mounting the aforementioned front and rear wheels and a steering mechanism. The steering mechanism includes handlebars 20 and a central steering column 22 in which the handlebars are pivotally mounted. Mounted towards the rear of the frame is a seat 24 which preferably comes with a vertically disposed support 26. The seat is located relatively close to the ground compared to a standard bicycle. The position of the seat and location of the handlebars permits the rider to drive the bicycle in a safe heads-up attitude. Because of the low seat position, there is less likelihood of the rider being thrown head first over the handle bars during a crash or mishap. Because the two front wheels 14 and 16 are located outwardly from the position of the rider, protection is provided for the rider's hands and body during a sideways fall or during a sideswipe by another vehicle. In order to provide a reasonably comfortable ride, the rear wheel 12 is rotatably mounted on a triangular frame structure 28 which is supported at the top corner by a coil spring 30. Pivotal movement between the frame structure 28 and the remainder of the frame 18 is permitted by the pin support at 32. The frame structure 28 has two horizontal frame members 34, one on each side of the rear wheel, two upwardly and forwardly inclined frame members 36 and two frame members 38 connecting the forward ends of members 34 and 36. The front end of the spring 30 is connected to the vertical post 40 at the top of which the seat is mounted.

Each of the two front wheels 14, 16 is mounted on its own steering column 42, 44. Each of these steering columns can be constructed in the usual manner for a bicycle steering column, that is, there is an outer sleeve in which is mounted ball or needle bearings to rotatably support an internal post. The top end of each internal post projects from the top of the sleeve and is indicated at 46 in FIG. 3. The mounting means for the front wheels include two tiltable elongate members 47 and 48. Each of these members has the steering column 42 pivotally connected to one end and the steering column 44 pivotally connected to the other end thereof. Two sets of lugs are provided on each of the steering columns 42 and 44 for connecting the elongate members 47, 48. Pivot pins extend through these lugs 49, 50 and through the ends of the members 47, 48. Preferably the elongate members 47, 48 are leaf springs which also act to give the tricycle a comfortable, cushioned ride. The degree of tilt of the members 47, 48 is limited by two stop members 52 which can have a rubber plug or cover 54 at the bottom end which engages the lower elongate member 48. The stop members 52 are rigidly mounted on a sleeve 56 mounted near the top of the central steering column 22.

Figure 3:
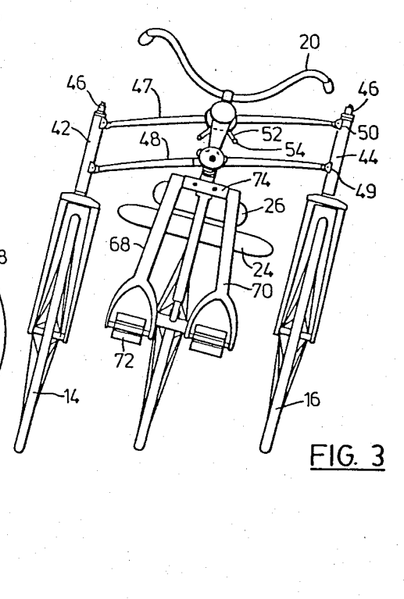
FIG. 3 is a front view of a tricycle, which view illustrates the ability of the tricycle to tilt when negotiating a curve.

The steering mechanism will now be described in further detail with particular reference to FIGS. 1 to 3. The handlebars 20 are rigidly connected to a central, rearwardly extending arm 58 that is pivotally connected to a transversly extending link 60. This link is pivotally connected at its ends to outer arms 62 and 64. These arms are rigidly connected to the aforementioned tops 46 of the posts in the steering columns 42, 44. It will be readily seen that turning of the handle bars 20 will result in a corresponding turn in the two front wheels 14, 16. Moreover the front wheels will be turned approximately in unison. In actual fact these wheels are turned at slightly different rates so that each wheel remains tangential to its curved turning path.

The pedal drive for the tricycle 10 will now be described with particular reference to FIGS. 1 to 3. This drive includes pedal means pivotally mounted on a frame member 66 which extends forwardly from the bottom end of the central column 22. The pedal means include two elongate arm members 68, 70, each with a foot pedal 72 mounted on its bottom end. In the preferred embodiment shown, each arm member 68, 70 is forked at its lower end and the foot pedal is mounted between the two prongs of the fork. The foot pedals can be constructed in the usual well known manner used for bicycles. They can be provided with bearing supports to permit the pedals to rotate freely on shafts mounted at the bottom end of the arm members. The upper end of each arm member is pivotally mounted on a transverse extension 74 of the frame member 66. Although a simple sleeve bearing could be provided to mount the upper ends of the members 68, 70, the use of ball bearings or needle bearings in the transverse extension 74 is preferred. The use and construction of such bearings is per se well known and therefore has not been illustrated in the drawings.

Figure 7:
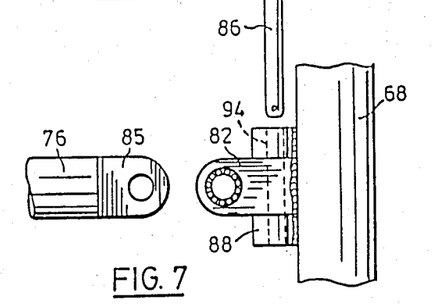
FIG. 7 is a side detail view showing how each connecting link is connected to its pedal member.
Figure 8:
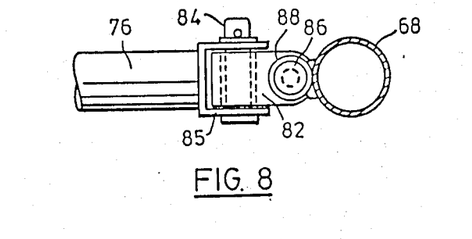
FIG. 8 is a top detailed view of the swivel joint provided between the connecting link and its pedal member.

Two connecting links 76 are used to connect the arm members 68, 70 to a pair of endless chains 78, 80. A connecting device 82, the construction of which can be seen clearly from FIGS. 7 and 8, secures the front end of each link 76 to its respective arm member. Each device 82 permits pivotal movement of the link 76 in a vertical plane defined by the movement of the respective arm member 68, 70 and in a plane substantially perpendicular to said vertical plane. In other words the device 82 provides a "universal" type connection. This helps to prevent the link from twisting its endless chain off of its sprockets. The connecting device 82 has a needle bearing 83 arranged therein to rotatably receive a pin 84. This pin 84 extends through two fork members 85 provided on the adjacent end of the link 76. The fork members can be provided by brazing or welding a U-shaped member (See FIG. 8) onto the end of the link. A pivot pin 86 extends through the two holes 94 formed by lugs 88 that are brazed or welded to the back of each arm member 68, 70. In addition to the connecting device 82, a coil spring 96 resiliently connects each link 76 to its respective arm member. As shown in FIG. 2, each coil spring is connected at one end by means of tab 98 to the link 76 and at the other end by tab 100 to the arm member. The springs 96 act to prevent a dead-centre locking of the pedal drive during use thereof. The springs provide a lifting force greater than the weight of the links 76 which are preferably tube members.

Figure 4:
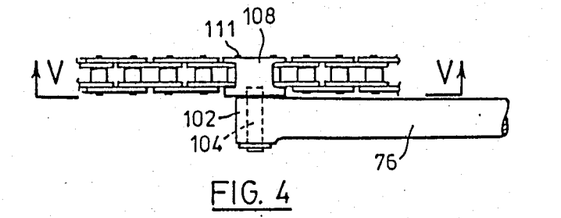
FIG. 4 is a detailed top view showing how a connecting link is joined to an endless chain.
Figure 5:
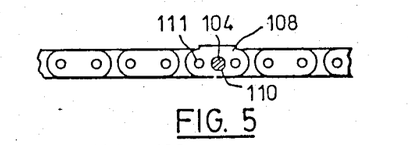
FIG. 5 is a side view taken along the line V—V of FIG. 4.
Figure 6:
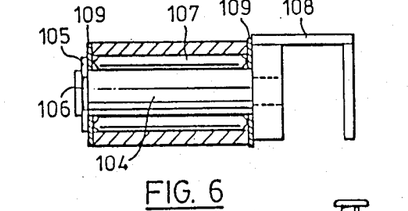
FIG. 6 is an end view partly in section showing the channel-shaped member and bearing used to secure each connecting link to its respective chain.

The connection between each link 76 and its respective endless chain, 78, 80 is shown in detail in FIGS. 4 to 6. The rear end of each link 76 is provided with a tubular transverse member 102 that can be welded to the link and in which is mounted a hardened pin 104 and preferably a needle bearing 107. The pin 104 is free to rotate in the member 102 and is held therein by a circlip retainer 105 that fits in a groove 106 extending around the end of the pin. The member 108 is open at both ends and along the bottom thereof. The member 108 has an opening 110 in one side, in which opening the pin 104 is press fitted. The channel member 108 is connected by two pins 111 to adjacent links of the endless chain. It will be seen that the construction of the member 108 does not interfere with the passage of the chain overs its sprockets. Washers 109 are preferably mounted at each end of the member 102 as shown.

The four sprockets on which the endless chains 78, 80 are mounted will now be described with particular reference to FIGS. 1 and 2. A pair of matched, laterally spaced sprockets 112, 113 are mounted on a transverse shaft (not shown) extending through the mounting sleeve 114. The transverse shaft can be rotatably mounted by means of bearings in the sleeve 114 in the usual manner. Because the sprockets 112, 113 are rigidly mounted to a single shaft, they rotate in unison and are equally able to drive a third endless chain 116 connected to the rear wheel. There is also a pair of matched, laterally spaced sprockets 118, 120 rotatably mounted forwardly of the sprockets 112, 113. Each of the forward sprockets 118, 120 is aligned in a common plane with a corresponding rear sprocket. The sprockets 118 and 120 are mounted on separate stub shafts (not shown) located in the sleeve 122. Because they are free to rotate independently of one another, they can take up the slack or permit slack in their respective endless chains 78, 80 as may be required during pedalling. If desired, the forward sprockets 118, 120 can be mounted individually in such a manner that stroke chain tension can be accurately set for each side. This would simply involve the mounting of each sleeve in such manner that it can be moved forwardly or rearwardly as required. It shall also be noted that the two links 76 are connected to their respective endless chains at diametrically opposite points on the chain loops. In this way one of the endless chains is always transmitting power to the rear sprockets and continuous forward motion of the tricycle is assured. The diametrically opposite positions of the two connecting devices 108 is assured by the common transverse shaft connecting the sprockets 112, 113.

The third chain 116 forms part of the transmission means connecting the transverse shaft in sleeve 114 to the driven rear wheel. The chain 16 is moved in response to pedalling of the foot pedals 72. The transmission means further includes a fifth sprocket 124 which can be of the same size as the immediately adjacent sprocket 112. The rear end of the chain 116 passes around a smaller sprocket 126 mounted on the hub of the driven wheel. If desired a multiple gearing system can be provided at the hub of the rear wheel in the same manner as presently used on multispeed bicycles.

Figure 15:
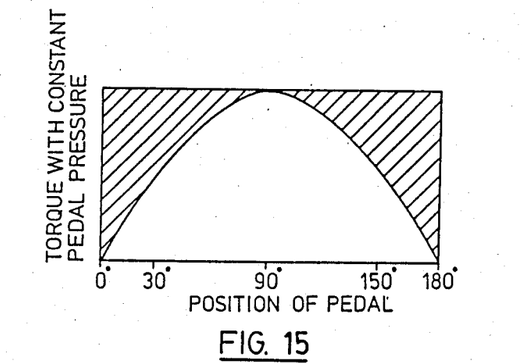
FIG. 15 is a graphical illustration of one power stroke in a conventional bicycle pedal crank system.

The distinct advantage of the pedal drive described above is apparent from an examination of the graphical representations presented in FIGS. 15 and 16 of the drawings. FIG. 15 illustrates the amount of useful work or torque developed by one power stroke applied to a conventional bicycle pedal crank system. The graph assumes that the crank system is operated by the normal "pusher" cyclist. Probably 99% of cyclists fall into this category. At the zero degree position of the pedal, the amount of downward pedal pressure that is converted to useful torque is zero. The pedal is in this position when the crank arm extends straight up. As the pedal moves forward, more pedal pressure is converted to useful work until you have maximum conversion of the pedal pressure to torque at the 90 degrees position of the pedal. The amount of useful work is represented by the clear area below the graph line while the shaded area above the graph line represents wasted effort.

FIG. 16 is a graphical representation of one power stroke using the pedal drive of the present invention and operated by the normal "pusher" cyclist. Efficiency of the present system is theoretically as high as 87% compared to the mere 64% theoretical efficiency for a conventional pedal crank system. It will be appreciated that the present system is capable of converting almost 100% of the pedal pressure to useful torque as the pedal is pulling the endless chain through the straight line portion of the chain loop. This portion of the pedal drive cycle is represented by the clear rectangle extending between the two vertical dash lines marked 130. Only during the curved sections of the chain loop is part of the pedal pressure not converted to useful torque. Again the wasted effort is represented by the shaded areas at each end of the graph. In FIG. 16 the zero point on the horizontal scale represents the position of the drive when the channel member 108 is at the rearwardmost point of its respective chain loop. The graphical illustration of FIG. 16 is based on a pedal drive wherein the sprockets rotate 2.2 time for each complete revolution of the chain loop. Variations in this ratio could of course be made if desired.

Figure 10:
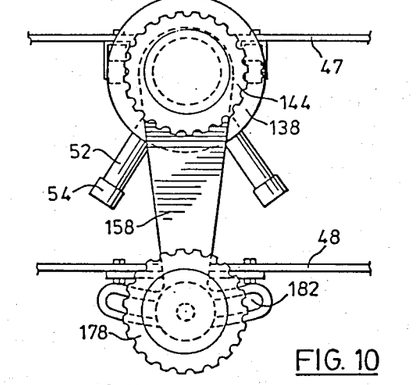
FIG. 10 is a front detail view of the biasing device or tilt-trim control.
Figure 11:
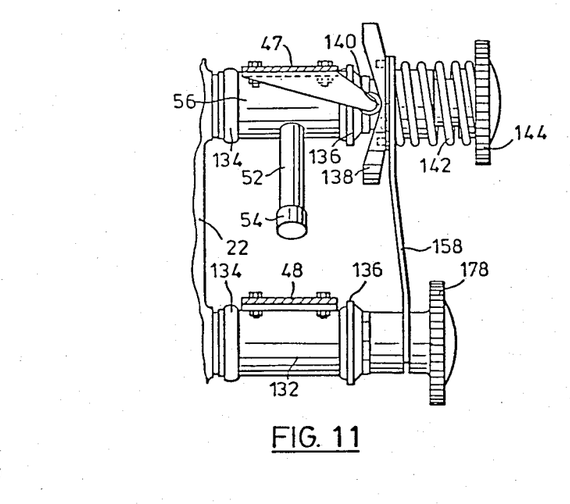
FIG. 11 is a side detail partly in section, of the biasing device of FIG. 10.
Figure 12:
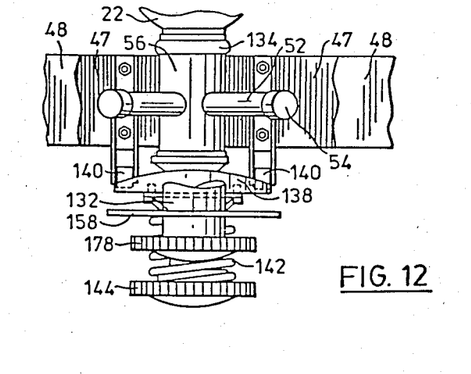
FIG. 12 is a bottom view of the biasing device with part of the lower portion omitted for purposes of illustration.
Figure 13:
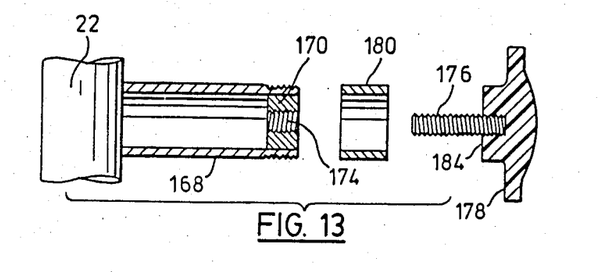
FIG. 13 is a sectional side view showing the construction of the components used to construct the lower portion of the biasing device.
Figure 14:
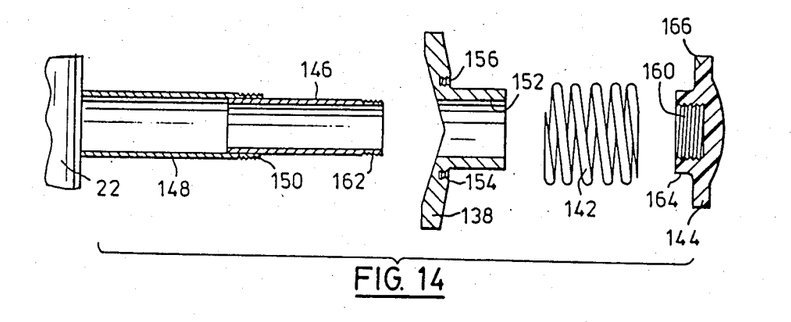
FIG. 14 is a sectional side view showing the construction of certain components used to construct the upper portion of the biasing device.

FIGS. 10 to 12 illustrate the means for tiltably connecting the centre of each transversely extending elongate member 47, 48 to the central steering column 22 and means for biasing the tiltable elongate members to a tilting or non-tilting position. The biasing means engage at least one of the two tiltable elongate members. In the illustrated embodiment the biasing means engage the upper elongate member 47. The elongate member 47 is rigidly connected, such as by bolting to the sleeve 56 while the elongate member 48 is rigidly connected to a sleeve 132. Both of sleeves 56 and 132 are rotatably mounted on inner tubes that are illustrated in FIGS. 13 and 14. Ball bearing assemblies 134 and 136 are provided at each end of the sleeves 56, 132 to enable free rotation of the sleeves. A detailed descriptions of these assemblies is believed unnecessary as the construction and mounting of these assemblies is the same as in a standard steering head assembly.

The aforementioned biasing means includes a slidable cam 138, cam follower means 140 mounted on the elongate member 47 and engaging the cam 138, and spring means 142 acting to push the cam 138 in the direction of the follower means. The biasing means is adjustable by turning a knurled knob 144 so that the force created by the biasing means tending to bring the members 47, 48 to the desired tilting or non-tilting position can be increased or decreased. It will be appreciated that rotating the knob 144 acts to shorten or lengthen the coil spring 142 which acts on the cam.

Figure 9:
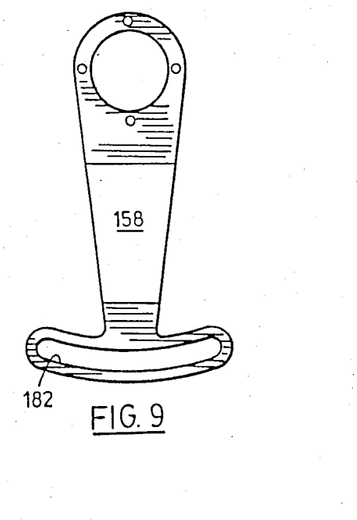
FIG. 9 is a front view of a metal strap used to adjust the biasing device.

Turning to FIG. 14 of the drawings, the cam 138 is slidably mounted on an open ended tube 146 which is externally threaded at its forward or outer end. One end of the tube 146 is brazed to a larger tube 148 on which the aforementioned sleeve 56 is rotatably mounted. Alternatively a single machined tubular member can be used in place of the tube 146 and 148. One end of the tube 148 is rigidly connected such as by welding to the central steering column 22. The other end of tube 148 acts as a stop for the sliding movement of the cam 138. The end 150 has a larger diameter than the diameter of the circular passageway 152 that extends through the cam 138. The cam 138 is formed with a shoulder 154. Four threaded holes 156 are distributed evenly about this annular shoulder and are adapted to receive suitable screws used to connect a metal strap 158 to the cam. The shape and construction of the strap 158 is shown in FIG. 9 and will be described further hereinafter.

The knob 144 which can be made of a tough plastics material has a central opening 160 which is threaded for attachment on the end 162 of the tube member 146. The coil spring 142 has an internal diameter slightly larger than the diameter of the knob at 164. Thus one end of the spring 142 presses against the radially extending flange 166 of the knob. It will be readily seen that turning of the knob 144 onto the threaded end of tube 146 will act to further compress the spring 142 and thus increase the biasing force acting on the cam 138. The force can be decreased by turning the knob in the opposite direction. Turning now to the parts shown in FIG. 13 of the drawings, a tube member 168 is rigidly connected at one end to the centre column 22. The aforementioned sleeve 132 is rotatably mounted on the tube 168. Brazed into the open end of tube 168 is a drilled and tapped metal plug 170. The threaded central opening 174 accommodates a threaded extension 176 of a knob 178. A relatively short cylindrical member 180 spaces the knob 178 away from the plug 170. The aforementioned strap 158 is extended at its bottom end where there is a curved slot 182. The bottom end of the strap fits between the member 180 and the knob 178 as shown in FIG. 11. It will be understood that the threaded extension 176 passes through the slot 182. By turning the knob 178, the bottom end of the strap 158 can be clamped between the end 184 of the knob and the spacer 180. It will appreciated that the knob 178 can be used as a tilt-trim control. By a variation in the position of the anchor or strap member 158, the tricycle can be biased towards either an upright, non-tilting position or to a desired tilting position. The control knob 178 can be operated as the tricycle is being pedalled. By loosening the knob 178 and thereby permitting movement of the strap 158 and the attached cam, the cam will rotate about its centre axis until it is located at the correct position for the current tilt of the bicycle. The knob 178 can then be tightened to set the position of the strap and the attached cam. Thus the tilt of the vehicle can be adjusted to allow for a continuing road crown, a crosswind or perhaps a load imbalance. The described biasing means has the advantages of being simple in its construction, inexpensive to manufacture and of light weight. Moreover the biasing means is unlikely to significantly increase the wind resistance of the tricycle. It will be appreciated that the tilting arrangement of the present invention could also be incorporated with advantage in other light weight vehicles. Examples of such vehicles would include snowmobiles, motorcycles and a light, three-wheeled car. The proposed biasing means could also be incorporated in such vehicles if desired.

It will be seen that the described vehicle, in particular the drive system therefor provides a very efficient conversion of human muscular energy to transportation power. Moreover the vehicle permits a more comfortable, less tiring riding attitude than is common with many known bicycles. The whole upper torso can now be in an energy-saving state of relative relaxation while the leg muscles, working against a back rest, efficiently propel the machine. The present drive system also permits the pedals to have good ground clearance.

As shown in FIG. 2, the wheelbase, head angle and rake of applicant's tricycle can be made to match those of conventional bicycles, resulting in desirably similar balance and handling.

It is obvious that the pedal drive system described herein could be used for other purposes than that of driving a tricycle. Similar pedal drives could be used to propel very light aircraft, to drive pumps or power generators, or to form an exercise device. Generally speaking the drive system could be employed in a great many circumstances where useful work must be produced from muscular energy.

It will be clear to those skilled in the art that various modifications and changes could be made to the described preferred embodiment without departing from the spirit and scope of this invention. Accordingly all such modifications and changes as fall within the scope of the appended claims are intended to be covered.

I claim:

1. A pedal drive for driving a multiwheel vehicle having a driven wheel comprising
    a pair of matched, laterally spaced rear sprockets adapted to be rotatably mounted on a frame of said vehicle;
    a pair of matched, laterally spaced sprockets rotatably mounted forwardly of the rear sprockets, each of the forward sprockets being aligned in a common plane with a corresponding rear sprocket;
    an endless chain extending about each pair of corresponding sprockets;
    pedal means adapted to be pivotally mounted on a frame member of said vehicle, said pedal means comprising two elongate arm members each with a foot pedal mounted on its bottom end;
    a pair of connecting links each of which is connected to one of said elongate arm members at one end and to one of the endless chains at the other end of the link;
    a connecting device securing said one end of each link to its respective arm member, said connecting device permitting pivotal movement of the link in a vertical plane defined by the movement of the respective arm member and in a plane substantially perpendicular to said vertical plane; and
    transmission means adapted for connection to the aforesaid driven wheel to drive the same in response to rotation of said rear sprockets.

2. A pedal drive according to claim 1 wherein said transmission means comprises a fifth sprocket mounted to rotate with said rear sprockets and another endless chain extending about said fifth sprocket and adapted to engage a sprocket mounted on the hub of said driven wheel.

3. A pedal drive according to claim 2 including two coil springs, each spring connected at one end to one of said links and at the other end to a respective arm member, and wherein said springs act to prevent a dead-centre locking of the pedal drive during use thereof.

4. A pedal drive according to claim 2 wherein each elongate arm member is provided with bearing means at the top end thereof for pivotally connecting the arm member to said frame member.

5. A tricycle comprising
    a frame including means for mounting front and rear wheels and a steering mechanism;
    a seat mounted on said frame;
    a single driven rear wheel mounted to said frame;
    a pair of steerable, spaced-apart front wheels mounted to said frame;
    means for turning said front wheels substantially in unison;
    a pair of matched, laterally spaced rear sprockets rotatably mounted on said frame;
    a pair of matched, laterally spaced front sprockets rotatably mounted on said frame and disposed forwardly of said rear sprockets, each of said front sprockets being aligned in a common plane with a corresponding rear sprocket;
    an endless chain extending about each pair of corresponding sprockets;
    pedal means pivotally mounted on said frame at a forward point thereof, said pedal means comprising two elongate arm members each with a foot pedal mounted on its bottom end and each pivotally connected to the frame at top end of the arm member;
    a pair of connecting links each of which is connected to one of said elongate arm members at one end and to one of the endless chains at the other end of the link;
    a connecting device securing said one end of each link to its respective arm member, said connecting device permitting pivotal movement of the link in a vertical plane defined by the movement of the respective arm member and in a plane substantially perpendicular to said vertical plane; and
    transmission means connected to the rear wheel to drive the latter in response to rotation of said rear sprockets.

6. A tricycle according to claim 5 wherein said transmission means comprises a fifth sprocket mounted to rotate with said rear sprockets and another endless chain extending about said fifth sprocket and a sixth sprocket mounted on the hub of said rear wheel.

7. A tricycle according to claim 5 wherein said foot pedals are mounted to move back and forth in parallel spaced-apart planes and are located between said front wheels.

8. A tricycle according to claim 5, including two coil springs, each spring connected at one end to one of said links and at the other end to a respective arm member, and wherein said springs act to prevent a dead-centre locking of the pedal drive during use thereof.

9. A tricycle comprising
    a frame including means for mounting front and rear wheels and a steering mechanism, said steering mechanism including a central steering column and handlebar means pivotally mounted in said column;

a seat mounted on said frame;

a single rear wheel connected to said frame;

means for driving said rear wheel;

a pair of spaced-apart front wheels each connected to said frame by its own steering column and steerable by said steering mechanism;

said mounting means including two, transversely extending, tiltable elongate members comprising leaf springs, each of which has the steering column of one of said front wheels pivotally connected to one end thereof and the steering column of the other of the front wheels pivotally connected to the other end thereof;

means for tiltably connecting the centre of each transversely extending elongate member to said central steering column; and means for biasing said tiltable elongate members to a tilting or non-tilting position, said biasing means engaging at least one of said two tiltable elongate members.

10. A tricycle according to claim 9 wherein said biasing means includes a slidable cam, cam follower means mounted on one of said tiltable elongate members and engaging said cam, and spring means acting to push said cam in the direction of the follower means.

11. A tricycle according to claim 9 wherein said biasing means is adjustable so that the force created by said biasing means tending to bring the elongate members to the tilting or non-tilting position can be increased or decreased.

12. A tricycle according to claim 11 wherein said biasing means includes a slidable cam, cam follower means mounted on one of said tiltable elongate members and engaging said cam, and spring means including a coil spring acting to push said cam in the direction of said follower means, the pushing force created by said spring means being adjustable manually by a rotatable member engaging one end of said coil spring.

13. A tricycle according to claim 9 wherein said biasing means includes a slidable and pivotable cam, cam follower means mounted on one of said tiltable elongate members and engaging said cam, coil spring means acting to push said cam in the direction of said follower means, and means for pivoting said cam to a selected location about a central axis that extends in the direction of sliding movement of said cam whereby said pivoting means can be used to adjust said biasing means so that the elongate members are biased to either a non-tilting position or a desired tilting position.

14. A tricycle according to claim 13 wherein said pivoting means comprises a strap rigidly connected at one end to said cam and having a curved slot at the other end and manually adjustable means for clamping said other end of said strap, and wherein said clamping means includes a threaded pin that extends through said slot and is rotatably connected to said frame.

15. A tricycle according to claim 9 wherein said driving means comprises a rotatable transverse shaft mounted on said frame; a pair of matched, laterally spaced rear sprockets mounted on said shaft; a pair of matched, laterally spaced front sprockets rotatably mounted on said frame and disposed forwardly of said rear sprockets, each of said front sprockets being aligned in a common plane with a corresponding rear sprocket; an endless chain extending about each pair of corresponding sprockets; pedal means for driving the two endless chains; and transmission means connected with said transverse shaft and to the rear wheel to drive same in response to pedalling of said pedal means.

16. A tricycle according to claim 15 wherein said pedal means comprise two elongate arm members each with a foot pedal mounted on its bottom end and each pivotally connected to said frame at its top end and wherein a pair of connecting links are joined at their forward ends to said arm members and at their rearward ends to the endless chains.

* * * * *